United States Patent [19]

Chevereau

[11] Patent Number: 5,110,536
[45] Date of Patent: May 5, 1992

[54] DEVICE FOR WEDGING THE UPPER SUPPORT PLATE OF CLUSTER GUIDES IN RELATION TO THE VESSEL OF A NUCLEAR REACTOR

[75] Inventor: Gérard Chevereau, Le Raincy, France

[73] Assignee: Framatome, Paris, France

[21] Appl. No.: 613,073

[22] Filed: Nov. 15, 1990

[30] Foreign Application Priority Data

Nov. 15, 1989 [FR] France .................. 89 14988

[51] Int. Cl.$^5$ .............................. G21C 13/02
[52] U.S. Cl. .................. 376/285; 376/205
[58] Field of Search ............... 376/260, 261, 262, 461, 376/353, 285, 205

[56] References Cited

U.S. PATENT DOCUMENTS

| | | | |
|---|---|---|---|
| 4,096,034 | 6/1978 | Anthony | 376/285 |
| 4,097,332 | 6/1978 | Gibbons et al. | 376/285 |
| 4,786,461 | 11/1988 | Veronesi et al. | 376/285 |

Primary Examiner—Brooks H. Hunt
Assistant Examiner—Frederick H. Voss
Attorney, Agent, or Firm—Pollock, Vande Sande & Priddy

[57] ABSTRACT

A device for wedging and positioning the upper support plate of the guides of control clusters in relation to a bearing surface linked to the vessel of a pressurized-water nuclear reactor, comprising an upper ring (22) and a lower ring (23) laid onto the cluster guide support plate (8) and the bearing surface (9), respectively, and between which is seated a stack of preloaded elastic washers (24). The device comprises a hollow connecting shank (26) with an axial channel (44) and passing through the two rings, to engage in a bore (20, 21) formed in the support plate or the bearing surface, the lower ring (23) being connectable to the shank, while the upper ring is mounted slidably relative to the lower ring (23) under the effect of the load exerted on the elastic washers.

10 Claims, 2 Drawing Sheets

DEVICE FOR WEDGING THE UPPER SUPPORT PLATE OF CLUSTER GUIDES IN RELATION TO THE VESSEL OF A NUCLEAR REACTOR

FIELD OF THE INVENTION

The present invention relates to a device for the circumferential wedging and bearing of the upper plate which supports, above the core of a nuclear reactor of the "P W R" type, the guide tubes of the clusters of fuel elements forming the active part of the reactor, in relation to a bearing surface marking a reference position linked to the protection and containment vessel of the reactor and consisting either of a parallel flange extending the cylindrical casing surrounding the core, this flange being arranged under the support plate and resting on an internal stay of the vessel, or of a parallel surface provided above the support plate and belonging to the cover closing the top of the vessel.

BACKGROUND OF THE INVENTION

The solution of problems raised by the wedging of the upper support plate carrying the guide tubes of the fuel clusters in relation to the reactor vessel presents special difficulties, both because of the considerable diametral dimensions of this plate and owing to the need for maintaining, by way of the bearing means used, suitable circulation of the pressurized cooling fluid of the core contained in this vessel.

One solution known in the art involves simply mounting, between the support plate and its bearing surface on the flange of the core casing or the vessel cover, a ring slightly skewed on itself in the manner of an elastic washer, to form a conical spring abutting the two mutually confronting surfaces. Such a ring achieves the desired purpose of wedging, while at the same time affording satisfactory sealing between the cover of the vessel and the region provided between the latter and the support plate. In this case, however, contact between the bearing surfaces on the ring is made over a very narrow circular band, thus generating a high pressure on a very small bearing surface, thereby risking permanent deformations of the components in contact, with the need to replace these frequently, especially when they are damaged by the edges of the spring. There are also flow-adjusting devices consisting of stationary nozzles which are difficult to produce and which it is impractical to inspect and change, if so required. Moreover, this ring, because of its large diameter and thickness, necessitates means of production and of handling which are costly, bulky and difficult to operate, the difficulties increasing when this component has to be replaced once it is contaminated.

Another solution consists in ensuring the wedging of the support plate by means of an assembly of individual cartridges distributed uniformly about the axis of the vessel, each of these cartridges being formed from a stack of elastic washers, of the preloaded Belleville washer type, which are contained in a receptacle of the plate and which are retained by a cover screwed thereonto, this, a piston, which supports the flange of the core casing and which compresses the washers by means of a bearing collar integral with this piston, moving in this receptacle. Such an embodiment, described particularly in FR-A-2,407,384, also has the disadvantage, that, if the force exerted on the piston exceeds the load opposed by the washers, the bearing of the support plate is falsified, the cartridges no longer ensuring the desired wedging. To alter the seating of the support plate, the screws retaining the cover of the receptacle must then be removed for the purpose of acting on the stack of washers, and this operation, which must be carried out in a controlled atmosphere, increases the risks, especially of breakage of the normally blocked screws. This solution is therefore inconvenient and difficult to put into practice.

Finally, EP-A-0,138,477 discloses a structure for wedging the upper support plate of the cluster guides of a nuclear reactor in relation to the vessel, using an assembly of elastic washers, of the Belleville washer type, which are mounted between two suitable bearing surfaces provided between the support plate and a flange formed on the upper part of the cylindrical casing containing the reactor core. However, in such a solution, the stack of washers is loaded by a hollow bush which passes through this stack, this bush having a shoulder for bearing on the washers and being mounted slidably in a countersink provided in the flange. A sealing sleeve allows the cooling fluid to communicate with the regions located above and below the flange of the core casing. The disadvantage of such a solution is that the bush moves in relation to the flange, thus risking causing wear of the latter and falsifying the suitable wedging of the support plate in relation to the flange. Moreover, the sleeve ensuring the sealing comprises a metal bellows which inadequately withstands the ambient environment and especially the pressure of the fluid passing through the sleeve.

SUMMARY OF THE INVENTION

The object of the present invention is a device for wedging the upper support plate of the guides of the fuel clusters in relation to a bearing surface linked to the vessel of a nuclear reactor, which avoids these disadvantages by allowing reliable and effective relative positioning of the plate in relation to a bearing surface belonging to the casing of the reactor core or to the cover of the protective vessel; which is simple to produce and install and easy to replace; which, once mounted, permits the cooling fluid of the core to circulate through at least one calibrated orifice belonging to the device itself; and which can therefore be produced at the factory together with the latter before it is mounted in the vessel.

To this end, the device in question, comprising a set of two rings, namely an upper ring and a lower ring, which are laid one onto the support plate and the other onto the bearing surface and between which is seated a stack of preloaded elastic washers, comprises a hollow connecting shank having an axial channel and passing through the two rings, engaged in a bore in the plate or the bearing surface, the lower ring having means of connection to the shank, while the upper ring is mounted slidably in relation to the latter under the effect of the load exerted on the elastic washers, the shank furthermore, comprising means for fixing it to the plate or to the bearing surface inside the bore receiving it, the means of connection between the lower ring and the hollow shank, for making the various components captive during their handling, preferably consisting of radial pins passing through transverse passages in the ring and fixed to the latter, these pins penetrating into receptacles provided in the lateral surface of the shank.

Preferably, the radial pins are at least two in number and are uniformly distributed about the common axis of the shank and of the ring.

According to a particular characteristic of the device, the connecting shank has a bearing shoulder for the lower ring before the latter is immobilized in relation to the shank by means of the radial pins. Advantageously, the pins project slightly from the passages made in the ring and are immobilized on the latter, e.g., by welding.

According to another characteristic, the part of the shank penetrating into the bore made in the plate or the bearing surface has a substantially semicylindrical or frustoconical lateral groove receiving an O-ring seal capable of interacting with a receptacle machined opposite it in the bore. Thus, the hollow shank fixed to the lower ring by means of its radial pins and laid by this ring onto the surface of the support plate or of the bearing surface is immobilized in relation to the latter as a result of the penetration of the O-ring seal into the receptacle which is provided for receiving it and is formed in the inner wall of the bore, the shank being retained by the seal in the manner of a clip, thus making it possible in a simple way to detach them from one another quickly during a maintenance operation or a repair, thereby proportionately limiting the involvement of personnel working in a controlled zone.

Preferably, the stack of elastic washers mounted between the two rings is completed by at least one flat spacer arranged between the stack and the upper ring, in order to adjust the preload tension of the washers and the relative position of the two rings between the support plate and the bearing surface.

In a particular embodiment of the invention where the lower and upper rings bear respectively on a flange of the casing of the reactor core and under the support plate, the end of the shank opposite the bore receiving it is equipped with a connector having a calibrated nozzle for the flow of the pressurized cooling fluid successively through the shank, the bore and a passage provided in the plate. In this variant, the connector is advantageously immobilized on the shank by being screwed onto a thread formed at the end of the axial channel of the shank and by finally being blocked by means of a stop tab carried by the shank and turned down into a groove or slot of the connector.

In another embodiment where the lower and upper rings are laid respectively on the support plate and under a bearing surface of the cover of the reactor vessel, the upper ring has radial holes for the flow of the fluid after passage through the bore of the plate and the axial channel of the shank engaged in this bore.

BRIEF DESCRIPTION OF THE DRAWINGS

Other characteristics of a device for wedging the upper support plate of the guides of fuel clusters will also emerge from the following description of two embodiments of the invention given by way of example and with reference to the accompanying drawings.

DESCRIPTION OF PREFERRED EMBODIMENTS

Figure 1:
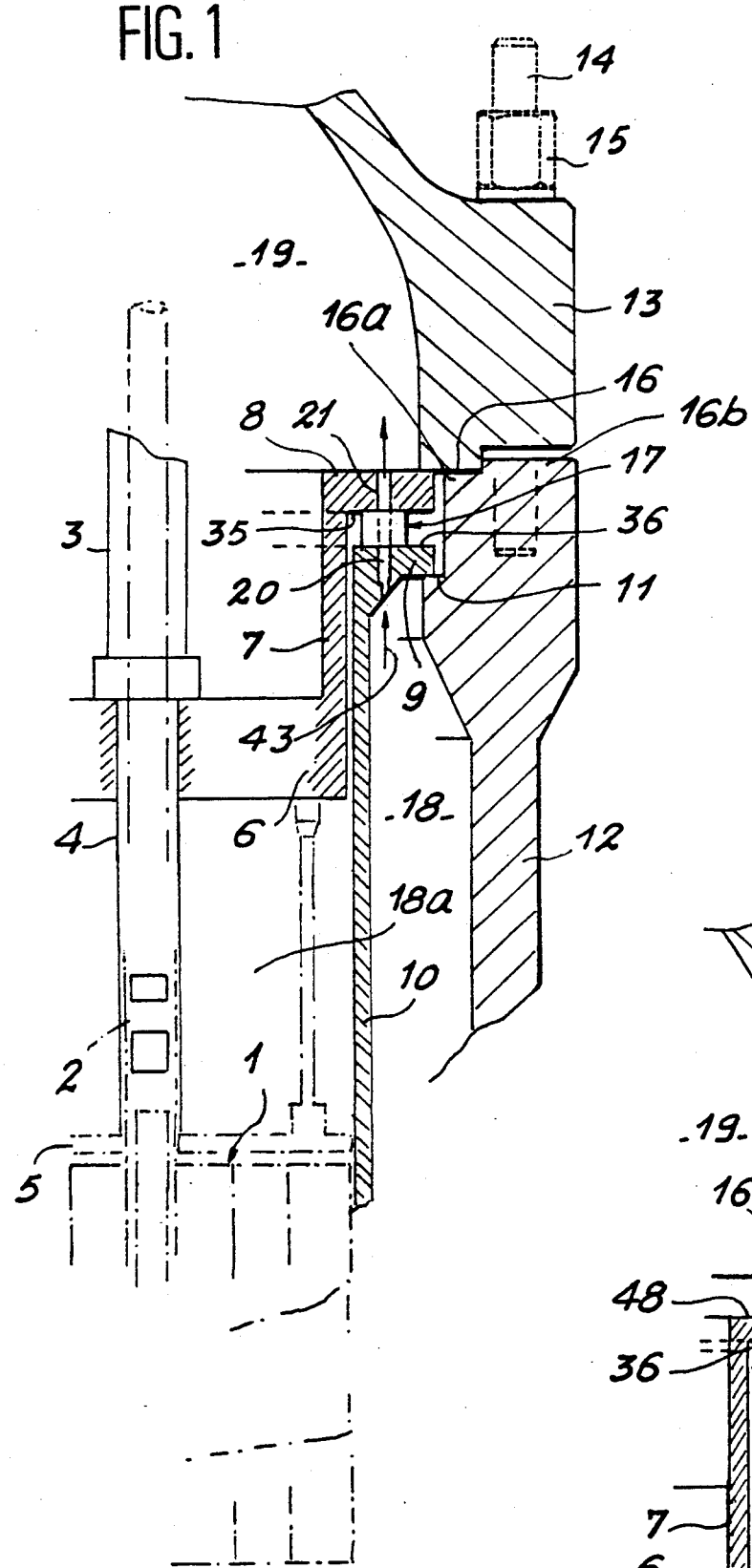
FIG. 1 is a schematic sectional view in a vertical plane of a part of the core of a nuclear reactor and of the main structures arranged inside the vessel of this reactor, particularly the support plate of the guide tubes of the fuel clusters and a casing surrounding the core.

FIG. 1, shows the core 1 of a nuclear reactor, especially of the pressurized water-cooled type. The core is formed by the juxtaposition of fuel assemblies, into which can be introduced control clusters 2, of which the details, well known per se in the art, are not of direct importance to the present invention.

The fuel control clusters can be introduced into or removed from the core by moving inside guide tubes 3 arranged vertically. Tubular spacers 4 maintain a suitable spacing between a horizontal plate 5, called an upper core plate, and a parallel plate 6 which extends above the plate 5 and to which the guide tubes 3 are fastened. This plate 6, through which the spacers 4 pass, is commonly known as a cluster-guide support plate. It is extended upwards on its periphery by a collar 7, itself terminating in a transverse flange 8 which is thus an integral part of the plate 6 and which is intended for ensuring that these plates are suitably supported and maintained in position above the core.

For this purpose, the support plate 6 rests by means of the flange 8 on a parallel flange 9 provided in the upper part of a cylindrical casing 10 or core casing surrounding the core laterally. The flange 9 bears with its outer edge on a bearing surface 11 provided in the vicinity of the upper end of the protection and containment vessel 12, in which are arranged the core 1 and the various elements of the installation mentioned briefly above. The vessel 12 is closed by a cover 13 immobilized on the vessel by means of bolts 14 of large cross-section which are blocked by means of nuts 15. The cover 13 comprises, towards the inside of the vessel, a bearing surface 16 which is laid on the upper face 16a of a flange 16b belonging to the vessel 12, on the one hand, and on the top of the flange 8 of the support plate 6, on the other hand, compressing between the latter and the parallel flange 9 wedging devices 17, of which the form of construction according to the present invention will now be described, particularly with reference to FIG. 2, such a device making it possible both to ensure that the two flanges 8 and 9 are maintained in the appropriate relative position, while at the same time allowing permanent communication between the region 18 located under the flange 9 and the region 19 above the flange 8 under the cover 13 for the cooling fluid of the core circulating through passages 20 and 21 provided respectively in these flanges.

Figure 2:
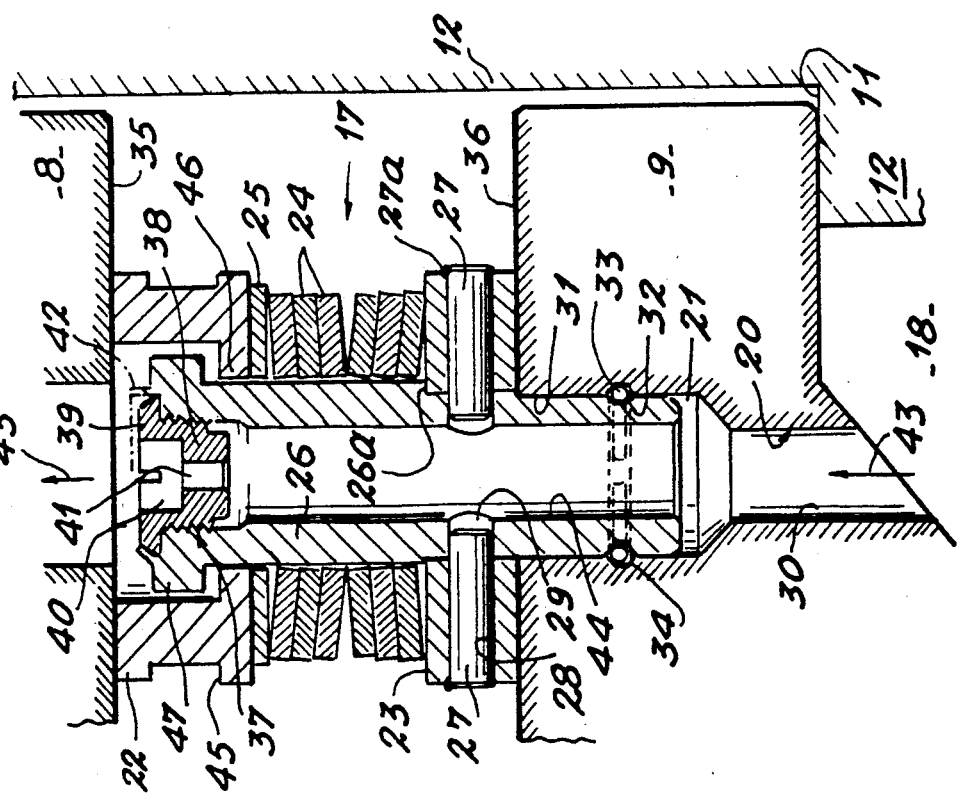
FIG. 2 is a cross-sectional view, on a larger scale, of the wedging device according to the invention mounted between the support plate and a bearing flange of the casing, in the embodiment illustrated in FIG. 1.

The device 17 illustrated in this FIG. 2 is mainly composed of an upper ring 22 and of a lower ring 23 which are of general cylindrical shape and the faces of which are parallel to one another and to the flanges 8 and 9. Mounted between these rings 22 and 23 is a stack of elastic washers 24 which are of the Belleville washer type and the number and shape of which are selected by virtue of construction so as to exert an exactly specific force on the flanges 8 and 9 by means of the two rings. Advantageously, the stack of washers 24 is associated with a flat calibrated spacer 25 making it possible to adjust the initial tension of the washers.

The two rings 22 and 23 are associated with a hollow connecting shank 26 arranged in such a way that it has a shoulder 26a bearing on the lower ring 23, while the shank passes freely through the washers 24 and the upper ring 22, particularly in order to allow the ring to slide slightly in relation to the lower ring 23, following the compression of the washers 24 as a result of the bearing of the flange 8 of the support plate on the ring 23. In contrast, this lower ring 23 is fixed to the shank 26 by means of an assembly of radial pins 27 engaged in through-passages 28 provided in the ring. These pins are of a number at least equal to and are uniformly distributed about the common axis of the ring and the shank. They penetrate into the latter in receptacles 29 machined in the wall of the shank 26 and are of such a length that they project slightly on the opposite side in relation to the periphery of the ring 23, being welded or otherwise fastened to the latter at 27a.

The bore 20 in the flange 9 supporting the lower ring 23 fixed to the shank 26 in the way mentioned above has a stepped profile in two parts 30 and 31 respectively, the part 30 of larger diameter receiving the lower part of the shank. The latter has a semicylindrical or frustoconical groove 32, in which is seated an O-ring seal 33 capable, when the shank is received in the bore, of interacting with a likewise semicylindrical or frustoconical receptacle 34 in the inner wall of the part 30 of the bore 20, so as to immobilize the shank in the latter in the manner of a clip, while allowing it to be removed quickly by simply pulling vertically on the device during maintenance or replacement operations.

The wedging device thus produced is mounted between the respective flanges 8 and 9 of the support plate of the cluster guides and of the core casing by laying the rings 22 and 23 against the mutually confronting parallel surfaces 35 and 36 of these flanges, while allowing them to bear mutually against one another as a result of relative compression of the washers 24, the lower ring 23 being immobilized together with the shank 26 against the flange 9, while, under the weight of the flange 8 and of the elements which it supports, the upper ring 22 can slide slightly in relation to the shank as a function of the compression exerted on the washers.

The shank 26, in its upper part, has a thread 37, in which is screwed a connector 38 equipped with an end collar 39. The connector 38 comprise an axial a duct 40 having a calibrated orifice 41, forming a nozzle. The connector 38, at the end of its screwing onto the bore 37, is immobilized and blocked in relation to the shank 26 by means of a tab 42 suitably turned down into a groove or slot (not shown). The cooling water of the reactor core flows from the bottom upwards in the direction of the arrow 43 from the bore 20 in the flange 9 as far as the passage 21 in the flange 8, passing through the channel 44 provided in the axis of the shank 26 and, at the end of the latter, the nozzle 41 which sets its flow rate at a specific value as a function of the pressure of the fluid in the region 18.

Finally, the upper ring 22 has an annular groove 45 in its outer surface, making it possible to engage the claws of a tool (not shown) ensuring the extraction of the wedging device in the event of the dismounting of the assembly as a whole, i.e., after removal of the support plate 6, the ring 22 being pulled upwards, thereby carrying with it the shank 26 as a result of the bearing of a rib 46 of this ring under a shoulder 47 provided in the upper part of the shank.

In some accidental operating circumstances, the pressure in the cavity 19 located above the plate 6 is higher than that in the cavity 18a between the plates 5 and 6, so that the resultant force can be higher than the calibration of the stacks of Belleville washers. This results in a movement of the support plate 6 of the guide tube 6 in relation to the vessel cover 12, thereby opening a passage cross-section between these two cavities. This valve effect makes it possible to limit this pressure difference and reduces excessive loads on the support plate.

Figure 3:
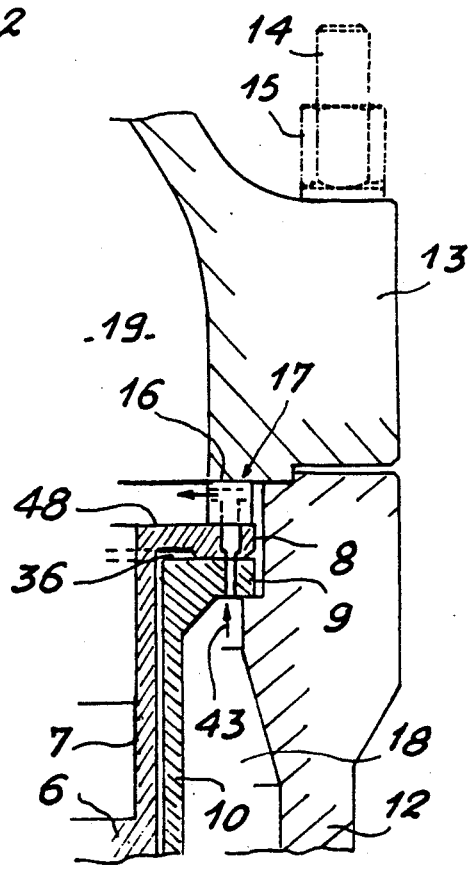
FIG. 3 illustrates an alternative embodiment, in which the wedging device is arranged between a bearing surface belonging to the cover of the reactor vessel and the support plate, itself resting on the flange of the core casing.

In another embodiment, shown schematically in FIG. 3, each wedging device 17 is mounted directly between the bearing surface 16 of the cover 13 and the upper face 48 of the flange 8, the latter resting directly on the surface 36 of the flange 9 of the core casing.

Figure 4:
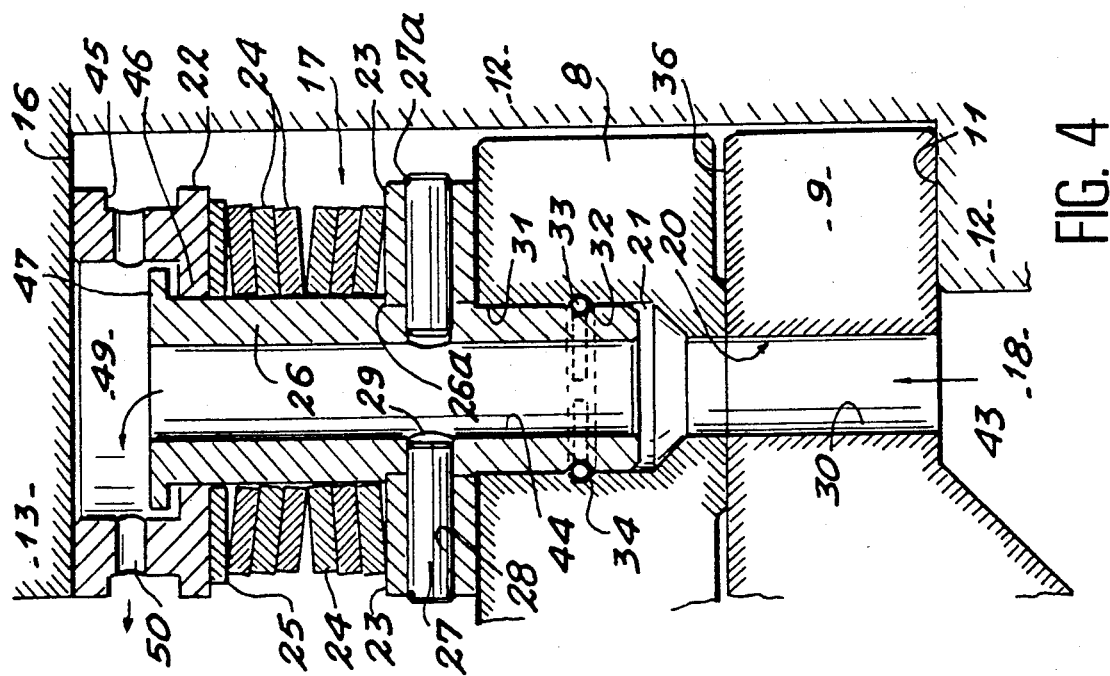
FIG. 4 is a sectional view, on a larger scale, of the wedging device used in the embodiment according to FIG. 3.

As can be seen in FIG. 4, the structure of the device is essentially the same as that illustrated in FIG. 2. In this case, however, the shank 26 does not have, at its upper end, a connector equipped with a flow-regulating nozzle, and the pressurized fluid coming from the space 18 under the flange 9, after passing through the passages 20 and 21 and flowing through the axial channel 44 of the shank, collects directly in a space 49 located inside the upper ring 22 between the upper part of the shank and the surface 16 of the vessel cover 13, so as to escape transversely towards the region 19 inside the cover via radial holes 50 suitably distributed in the ring 22 about the axis of the shank.

A device for wedging and positioning the internal structures of a nuclear reactor, especially the pressurized-water type, by means of a suitable number, for example approximately 30 identical devices, each of small dimensions, distributed about the axis of the vessel is thus provided. The device can easily be installed and removed simply by means of an engaging or pulling force, allowing the interaction of an O-ring seal and of a groove for receiving this O-ring in the manner of a clip, thereby avoiding difficult dismounting operations by using generally impractical handling equipment or tools. The assembly as a whole is inexpensive and, above all, affords appreciable operating safety, preventing the components in contact, bearing on one another, from being harmed or damaged under the effect of the sometimes considerable pressures which occur. At all events, the preload of the elastic washers can be adjusted without special difficulties, if modifications are made to the cover, for example by using fuel assemblies of different characteristics. contrary, it embraces all the variants.

I claim:
1. A device for wedging and positioning an upper support plate for guides of control clusters in relation to a bearing surface linked to a vessel of a pressurized-water nuclear reactor, said device comprising
   (a) an upper ring (22) and a lower ring (23) which are respectively laid onto said support plate (8) and onto said bearing surface (9) and between which is seated a stack of preloaded elastic washers (24);
   (b) a hollow connecting shank (26) provided with an axial channel (44) and passing through said upper and lower rings, said shank comprising a part engaging in a bore (20, 21) in said support plate or bearing surface;
   (c) said lower ring (23) having means (27) of connection to said shank, while said upper ring is mounted slidably in relation to said lower ring (23) under the effect of a load exerted on said elastic washers;

(d) said shank comprising means (33) for fixing said shank to said support plate or to said bearing surface inside said bore receiving said shank;

(e) said means of connection between said lower ring (23) and said shank (26) consisting of radial pins (27) passing through passages (28) formed transversely in said lower ring (23) and being fixed to said lower ring and penetrating into receptacles (29) provided in a lateral surface of said shank.

2. The device as claimed in claim 1, wherein said radial pins (27) are of a number at least equal to two and are uniformly distributed about a common axis of said shank (26) and said lower ring (23).

3. The device as claimed in claim 1 or 2, wherein said shank (26) has a a shoulder (26a) for bearing said lower ring (23) before said lower ring is immobilized in relation to said shank by means of said radial pins (27).

4. The device as claimed in claim 1 or 2, wherein said radial pins (27) project slightly from said passages (28) in said lower ring (23) and are immobilized on said lower ring by fastening means.

5. The device as claimed in claim 1 or 2, wherein said part of said shank (26) penetrating into said bore (20, 21) has a lateral groove (32) receiving an O-ring seal (33) interacting with a receptacle (34) machined in said bore opposite said groove.

6. The device as claimed in claim 1 or 2, comprising at least one flat spacer (25) arranged between said stack of elastic washers (24) and said upper ring, for adjusting preload tension of said washers and relative positions of said upper and lower rings between said support plate (8) and said bearing surface (9).

7. The device as claimed in claim 1 or 2, wherein said lower ring (23) and said upper ring (22) bear respectively on a flange (9) of said casing (10) of a core (1) of said reactor and under said support plate (8), wherein an end of said shank (26) opposite said bore (20, 21) receiving it is provided with a connector (38) having a calibrated nozzle (41) for flow of pressurized cooling fluid successively through said shank, said bore and a passage provided in said support plate.

8. The device as claimed in claim 7, wherein said connector (38) is immobilized on said shank (26) by being screwed onto a thread (37) formed at an end of said axial channel (44) of said shank and by being blocked by means of a stop tab (42) carried by said shank.

9. The device as claimed in claim 1 or 2, wherein said lower ring (23) and said upper ring (22) are laid respectively on said support plate (8) and under a bearing surface (16) of a cover (13) of said reactor vessel (12), said upper ring (22) having radial holes (50) for flow of fluid after passage through said bore (20) of said support plate and said axial channel (44) of said shank (26) engaged in said bore.

10. The device as claimed in claim 1 or 2, wherein said upper ring (22) comprises an exterior annular groove (45) for engagement of claws of a tool suitable for extraction of said device.

* * * * *